Patented June 2, 1953

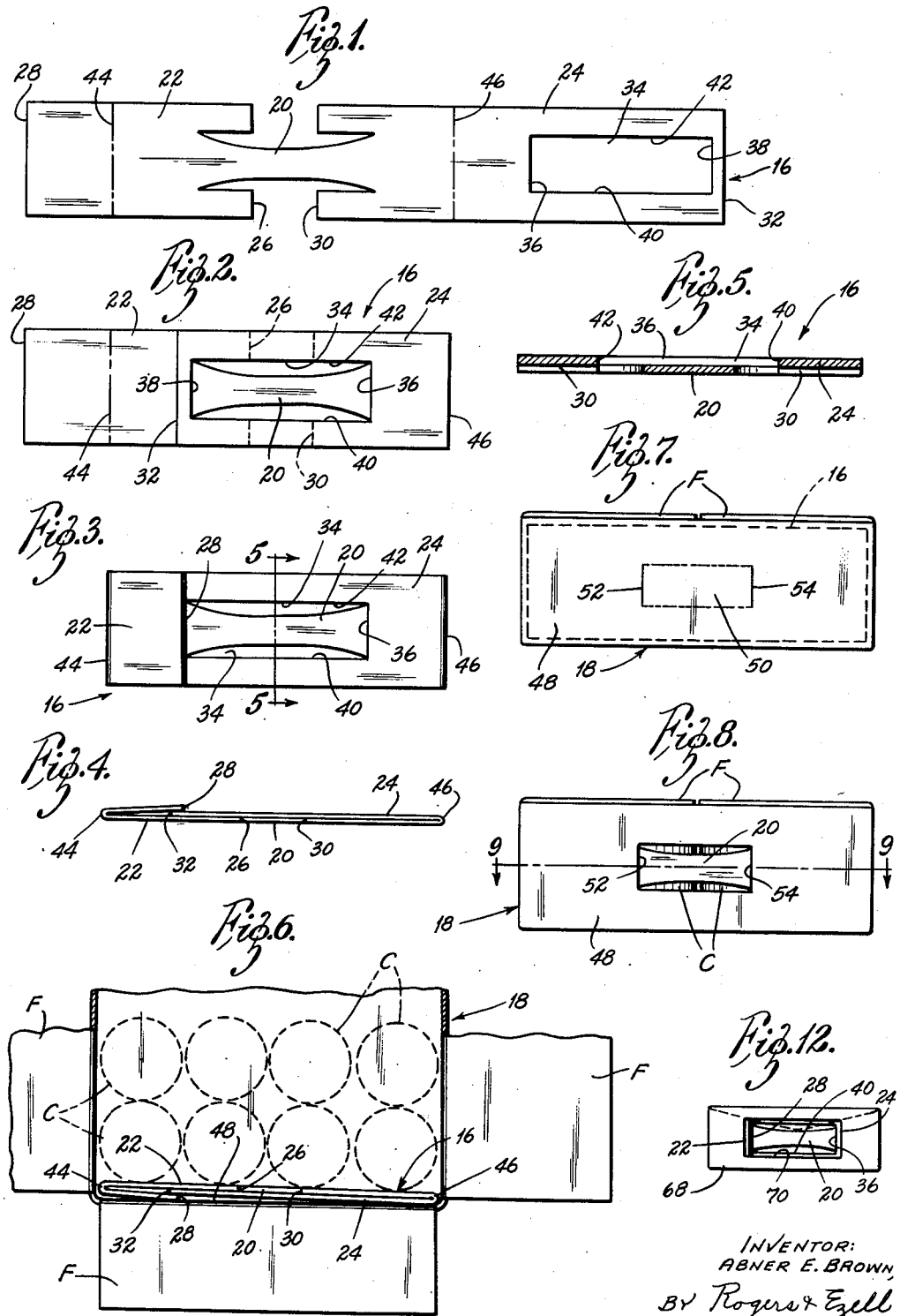

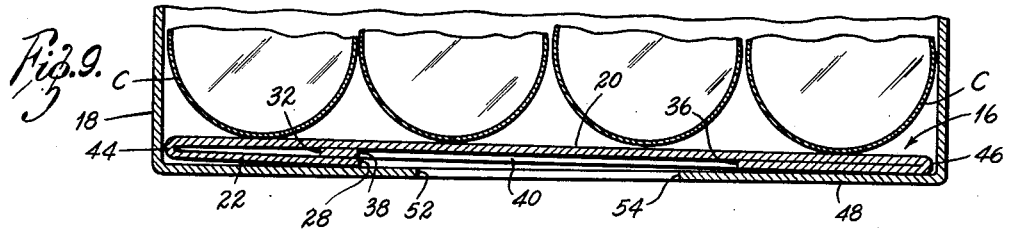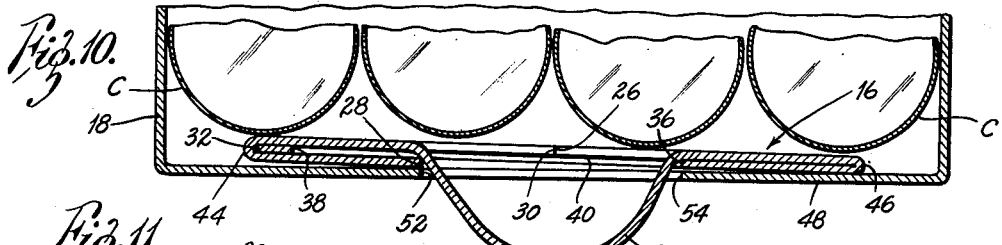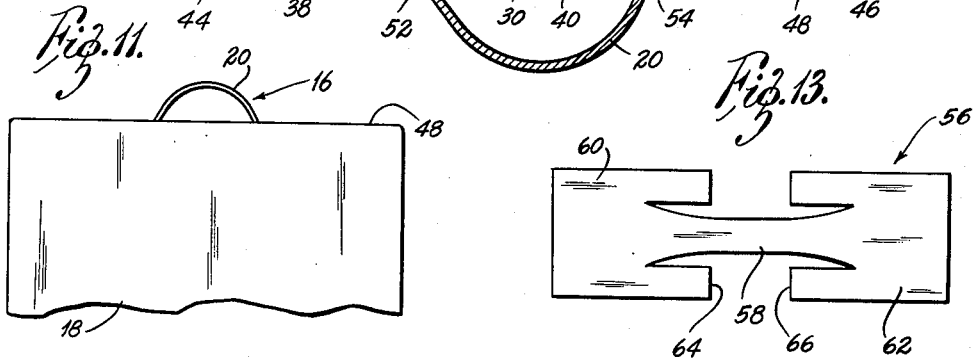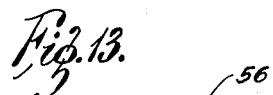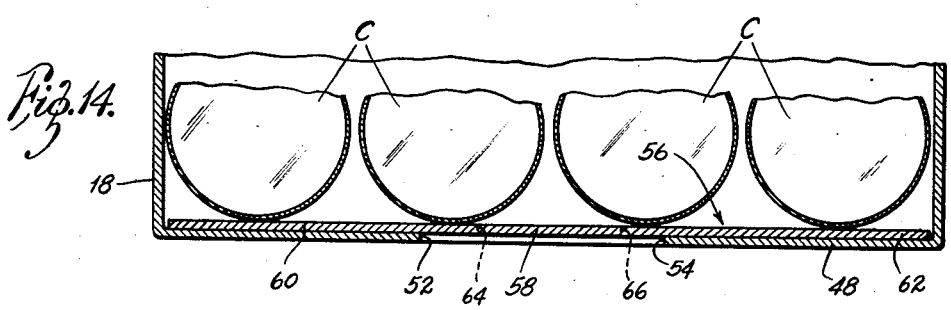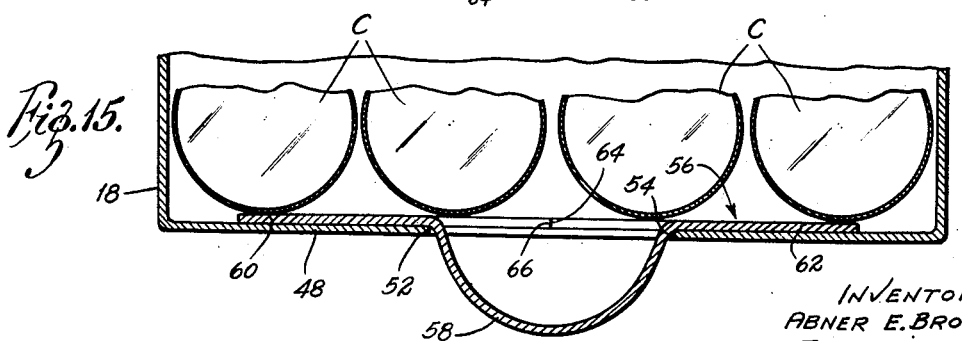

2,640,645

UNITED STATES PATENT OFFICE 2,640,645

HANDLE CONSTRUCTION FOR CARTONS AND THE LIKE

Abner Elmore Brown, Richmond Heights, Mo.

Application January 17, 1949, Serial No. 71,320

11 Claims. (Cl. 229—52)

The present invention relates generally to the container art, and more particularly to a novel handle member which is completely contained within the container prior to its use.

Most of the companies which sell consumer goods, particularly those in the food industry, endeavor to induce the public to purchase more than one can, box, bottle, etc., at a time. One method of accomplishing this is by packaging the goods in containers which hold a plurality of items.

One disadvantage of packaged purchasing from the consumer's standpoint, however, is the difficulty of carrying the packages, many of them being heavy and of an awkward shape.

To obviate this difficulty, some of the containers include handles, but many of these fail very easily due to a breaking or tearing of the container adjacent the handle, and once a customer has dropped a container because of a faulty handle he unintentionally, or otherwise, develops a sales resistance to the product.

The difficulty of tying the package with twine or rope is that it is a time consuming operation and the twine or rope is hard on the hands of the one carrying the package.

It is an object of the present invention, therefore, to provide a novel handle construction which can be safely used with relatively heavy containers without fear of having the handle break or tear through normal usage.

Another object is to provide a handle construction which is completely contained within the container prior to use.

Another object is to provide a novel handle construction which is separate from the container and which can be inserted in the container either before or after the goods have been packed therein.

Another object is to provide a novel handle construction which has a relatively wide hand-engaging surface.

Another object is to provide a novel handle construction in which the weight of the container and contents are distributed over a large area of the wall of the container with which the handle member is in contact.

Another object is to provide a novel handle construction and a container which includes a removable portion, for use therewith, whereby the handle can be brought into an operative position after the removable portion has been detached from the container.

Another object is to provide a container with a concealed handle which will comply with the shipping requirements of the Interstate Commerce Commission.

Another object is to provide a novel handle construction which is enclosed in a paper envelope prior to its being placed in the container.

Another object is to provide a novel handle construction, the handle portion of which is positively prevented from being totally withdrawn from the container when in an operative position.

Another object is to provide a novel handle construction which can be made in a single standard size for use with containers of various sizes.

Further objects and advantages of the present invention will be apparent from the following description, reference being had to the accompanying drawing wherein a preferred embodiment of the present invention is shown, in which:

Fig. 1 is a top plan view of one form of handle member constructed in accordance with the teachings of the present invention, showing the handle member in a flattened or unfolded position;

Fig. 2 is a top plan view of the handle member after the portion containing the opening has been folded over the remaining portions;

Fig. 3 is a top plan view of the handle member after the other portion has been folded over, showing the member ready for use in a container;

Fig. 4 is a side elevational view of the completely folded handle member;

Fig. 5 is an enlarged vertical sectional view taken on the line 5—5 in Fig. 3;

Fig. 6 is a fragmentary top plan view of a container with the top flaps open and showing a handle member inserted between the cans and one wall of the container;

Fig. 7 is an end view of a sealed container showing the removable portion;

Fig. 8 is the same as Fig. 7 except that the portion has been removed, thereby exposing the handle for use;

Fig. 9 is an enlarged horizontal sectional view taken on the line 9—9 in Fig. 8, showing the handle in the inoperative position;

Fig. 10 is the same as Fig. 9 but with the handle pulled into the operative position;

Fig. 11 is a fragmentary side view of a container showing the handle in the operative position;

Fig. 12 shows the handle member inserted in a paper envelope prior to its being inserted into a container;

Fig. 13 is a top plan view of a modified form of handle member showing it in a flattened or inoperative position;

Fig. 14 is an enlarged fragmentary horizontal sectional view of a container showing the modified form of handle member in a container, in the inoperative position; and Fig. 15 is the same as Fig. 14 except that the handle has been pulled into the operative position.

Referring to the drawings more particularly by reference numerals, specifically Figs. 1 through 11, 16 indicates generally a handle member for use with a container 18, both of which are constructed in accordance with the teachings of the present invention.

The handle member 16 is preferably made in one piece from a rectangular shaped sheet of cardboard or like material because of the consideration of cost, but manifestly it could be made of a stronger and more expensive material, or in separate parts if necessary or desirable.

Referring particularly to Fig. 1, the handle member 16 comprises a handle section 20 and elongated support sections 22 and 24 formed integral with the ends thereof which, for the purpose of description, will be referred to as the left-hand and right-hand support sections, respectively. The left-hand support section 22 has an inner edge 26 and an outer edge 28, and the right-hand support section 24 has an inner edge 30 and an outer edge 32.

In forming the handle section 20, the ends are cut into the inner edges 26 and 30 for a purpose to be described hereinafter.

The handle section 20 is formed in the shape shown in Fig. 1, with the ends of the handle member wider than the center portion primarily for two reasons: first, because it permits the handle member 16 to be formed more economically and, secondly, because the wider ends provide additional strength.

A rectangular shaped opening 34 is contained in the right-hand support section 24 and has transverse edges 36 and 38 and longitudinal edges 40 and 42. The length of the opening 34 is approximately the same as the length of the handle section 20 and its width the same as, or slightly greater than, the width of the handle section at the ends thereof.

Transverse fold lines 44 and 46 are contained in the support sections 22 and 24, respectively, so as to divide each section into outer and inner portions.

Referring particularly to Figs. 2, 3 and 4, the handle member 16 is made ready for use with the container 18 by first folding the outer portion of the right-hand support section 24 over the handle section 20, whereby the latter is disposed across the opening 34. It will be noted that in this position the transverse edge 36 of the opening 34 coincides with one end of the handle section 20 and the outer edge 32 of the support section 24 extends a short distance beyond the other end of the handle section. The outer portion of the left-hand support section 22 is then folded over so that its edge 28 overlaps the edge 32 of the right-hand support section and coincides with the other end of the handle section 20, as shown in Fig. 3.

The container 18 is shown filled with cans C solely for the purpose of illustration, and it is to be understood that the teachings of the present invention can be applied to containers for bottles, boxes, wearing apparel, etc. The container 18 is of ordinary construction with one exception, and includes a side wall 48 and top flaps F. The only difference between the instant container and the regular ones is that the side wall 48 of the former contains a portion 50 which is adapted to be removed.

The removable portion 50 is preferably rectangular shaped with square-cut ends 52 and 54, the distance between the ends being slightly greater than the distance between the edges 28 and 36 when the handle is in the operative position. The removability feature can be achieved in several ways, but the preferred construction is to perforate the outline of the portion 50 except for the ends 52 and 54 which are cut all the way through. This construction permits a user to insert a finger or an elongated instrument under either edge and easily tear out the entire portion 50.

In use, the handle member 16 is inserted in the container 18 between the cans C and the wall 48 after the cans have been loaded therein, the rectangular shaped opening 34 being adjacent the removable portion 50. As shown in Figs. 6 and 7, the length and width of the flattened, folded handle member 16 is approximately the same as the interior dimensions of the container 18 so that the opening 34 is automatically in alignment with the perforated portion 50. If it is desirable to use the handle with a very large container, the handle member 16 can be positioned by using false walls, by fastening the stationary end of it to the wall, etc. Thus it is apparent that a single standard size handle member can be used with containers of various sizes.

After the handle member 16 has been inserted, the flaps F are closed, thereby sealing the cans C within the container. Because there are no openings, as such, in the container, it complies with the shipping requirements of the Interstate Commerce Commission.

When the customer in a retail store has decided to purchase the contents of the container 18, she or the clerk merely inserts one finger through either the slot 52 or 54 cut in the wall 48 and tears out the removable portion 50. This exposes the handle section 20, as shown in Fig. 8, and, by inserting the thumb and forefinger into the spaces on either side of the handle section 20, it can be pulled upwardly into the operative position, as shown in Figs. 10 and 11.

When the handle section 20 is pulled upwardly, the folded left-hand support section 22 is pulled inwardly over the folded or outer portion of the right-hand support section 24. This movement continues until the inner edges 26 and 30 of the support sections abut. At the same time that this occurs, the outer edge 32 will also abut the left-hand support section 22 at the fold line 44, as shown in Fig. 10. Thus there are two independently operative means limiting the movement of the support sections toward each other.

It will be noted that in the operative position, as shown in Fig. 10, the edge 36 coincides with one end of the handle section 20 and the edge 28 coincides with the other end, so that in order for the handle to tear longitudinally it would be necessary to tear through two thicknesses of the material. Also, the central portion of the handle section 20 is narrow enough to permit comfortable carrying of the container, and the widened ends of the handle give additional strength at the line where most of the stress occurs.

A modified handle member 56 is shown in Figs. 13 through 15 and comprises a handle section 58 and support sections 60 and 62 formed integral with the ends thereof. The support sections 60 and 62 contain inner edges 64 and 66, respectively.

It will be noted from a comparison of Figs. 1 and 13 that the handle member 56 is of substantially the same shape as the central portion of the handle member 16 between the fold lines 44 and 46. Preferably it is the central section of the handle of Fig. 1 with the end sections removed. The operation of the modified form of handle member is also very similar to that of the handle member 16, the only difference being that the abutting of the edges 64 and 66 of the modified form are the only means limiting the inward movement of the support sections 60 and 62.

The modified construction is more economical to manufacture than the other form and can be used advantageously where the contents of the container are not heavy enough to warrant the stronger construction. Also, the handle member 56 is thinner than the other form when the latter is in the folded position, a feature which is highly desirable under certain circumstances.

Manifestly, with either form of handle construction, the weight of the container 18 and its contents is distributed over the upper surface of the support members and a large portion of the wall 48, thereby materially reducing the possibility of tearing a container having relatively thin walls.

If any projecting edges of either of the handle members have a tendency to catch on the tops of the cans C while they are being inserted between the cans and the wall 48, they can first be inserted and sealed in a paper envelope 68, as shown in Fig. 12, which has a rectangular shaped opening 70 in alignment with the handle section.

It is also manifest that the handle members can be placed in the container before the cans are packed therein.

Furthermore, when safety rules of various agencies do not interfere, the removable portion 50 can be omitted from the wall 48 so that the handle section 18 will be exposed in the opening for use at all times.

Thus it is apparent that there has been provided a novel handle construction which fulfills all the objects sought therefor.

It is to be understood that the foregoing description and the accompanying drawing have been given only by way of illustration and example, and that changes and alterations in the present disclosure, which will be readily apparent to one skilled in the art, are contemplated as within the scope of the present invention which is limited only by the claims which follow.

What is claimed is:

1. A handle member made from a sheet of cardboard or like material, comprising a relatively narrow flexible handle section, and relatively wide elongated support sections secured to the ends thereof, the outer portion of one of said support sections containing an opening, said outer portions being folded upwardly and inwardly on top of the handle section whereby the handle section is exposed in said opening.

2. A handle member made from a sheet of cardboard or like material, comprising a relatively narrow flexible handle section, and relatively wide elongated first and second support sections secured to the ends thereof, the outer portion of the first support section containing an opening, said outer portion being folded upwardly and inwardly so that the handle section is exposed in said opening, the outer portion of the second support section being folded upwardly and inwardly so that it overlaps the end of the outer portion of said first support section.

3. A handle member made from a sheet of cardboard or like material, comprising a relatively narrow flexible handle section, and relatively wide elongated first and second support sections secured to the ends thereof, the outer portion of the first support section containing an opening having an inner edge and an outer edge, said outer portion being folded upwardly and inwardly so that the handle section is exposed in said opening, the inner edge of said opening coinciding with one end of said handle section, the outer portion of the second support section being folded upwardly and inwardly so that it overlaps the end of the outer portion of said first support section, the end of the outer portion of said second support section coinciding with the other end of the handle section.

4. A handle member made from a sheet of cardboard or like material, comprising a relatively narrow flexible handle section, and relatively wide elongated first and second support sections secured to the ends thereof, said support sections containing inwardly extending finger-like projections on the inner edges thereof, the outer portion of the first support section containing an opening, said outer portion being folded upwardly and inwardly so that the handle section is exposed in said opening, the outer portion of the second support section being folded upwardly and inwardly so that it overlaps the end of the outer portion of said first support section, whereby when the handle section is pulled through the opening into the full operative position the ends of said finger-like projections abut and the end of the outer portion of the first support section abuts the second support section at its fold line.

5. In combination, a container having an opening in one wall thereof; and a handle member disposed within the container in register with the opening, said handle member including an elongated flexible handle section, support sections secured to the ends of the handle section which extend beyond the ends of said wall opening and which are drawn toward each other in the same plane as said wall so as to abut against each other and limit further withdrawal of said handle when the handle section is pulled through the opening in the container, and means separate from the container limiting the inward movement of the support sections.

6. In combination, a container having an opening in one wall thereof; and a handle member disposed within the container in register with the opening, said handle member including an elongated flexible handle section, and support sections formed integral with the ends of the handle section, said support sections including transverse portions and leg portions extending normal thereto beyond the ends of said opening, the leg portions being disposed on each side of the handle section whereby the ends of opposed leg portions are drawn towards one another in the same plane as said wall and abut so as to limit the inward movement of the support sections when the handle section is pulled through the opening into an operative position.

7. A packaged handle construction for use with a container having a removable portion in one wall thereof, comprising a flat envelope-like enclosure containing an opening in one face thereof; and a handle member disposed in said enclosure with the handle exposed in the opening, whereby when the package is disposed in the container adjacent the removable portion, the handle will be available for use when the portion is removed.

8. A device of the type described, comprising a handle portion; and a guide portion hinged to the handle portion at one end and adapted to be folded over on top of it, the guide portion containing an opening therein; the handle portion including a relatively narrow handle section in alignment with the opening, and a relatively wide support section secured to at least one end of the handle section, the support section being of a size to prevent said end of the handle section from being totally withdrawn through the opening.

9. A device of the type described, comprising a handle portion; and a guide portion hinged to the handle portion at one end and adapted to be folded over on top of it, the guide portion containing an opening therein; the handle portion including an elongated flexible handle section in alignment with the opening, support sections at the ends of the handle sections which are drawn together when the handle section is pulled through the opening, and means limiting the relative movement of the support sections.

10. A device of the type described, comprising a handle portion; and a guide portion hinged to the handle portion at one end and adapted to be folded over on top of it, the guide portion containing an opening therein; the handle portion including an elongated flexible handle section in alignment with the opening, and support sections at the ends of the handle section, the support sections containing inwardly projecting elements which abut to limit the relative movement of the support sections toward each other when the handle section is pulled through the opening into an operative position.

11. A device of the type described, comprising a handle portion; and a guide portion hinged to the handle portion at one end and adapted to be folded over on top of it, the guide portion containing an opening therein; the handle portion including an elongated flexible handle section in alignment with the opening, and support sections formed integral with the ends of the handle section, each of said support sections including a transverse portion and a pair of leg portions extending normal thereto, the leg portions being disposed on each side of the handle section whereby the ends of opposed leg portions abut to limit the relative movement of the support sections when the handle section is pulled through the opening into an operative position.

ABNER ELMORE BROWN.

References Cited in the file of this patent

UNITED STATES PATENTS

| Number | Name | Date |
|---|---|---|
| 1,039,619 | Webb | Sept. 24, 1912 |
| 1,194,172 | Harbeck | Aug. 8, 1916 |
| 1,882,524 | Sherman | Oct. 11, 1932 |
| 1,971,197 | Ottinger | Aug. 21, 1934 |
| 1,979,917 | Vaughn | Nov. 6, 1934 |
| 2,002,485 | Alfred | May 28, 1935 |
| 2,019,307 | Hill et al. | Oct. 29, 1935 |
| 2,128,723 | Zettler | Aug. 30, 1938 |
| 2,148,439 | Crawford | Feb. 28, 1939 |
| 2,258,582 | Berg, Jr. | Oct. 14, 1941 |
| 2,290,971 | King | July 28, 1942 |
| 2,335,115 | Gresser | Nov. 23, 1943 |
| 2,355,313 | Lurie | Aug. 8, 1944 |
| 2,365,887 | Lind | Dec. 26, 1944 |
| 2,482,399 | Bullock | Sept. 20, 1949 |
| 2,551,679 | Johnson | May 8, 1951 |

FOREIGN PATENTS

| Number | Country | Date |
|---|---|---|
| 450,672 | France | Jan. 25, 1913 |